United States Patent
Hsiao et al.

(10) Patent No.: US 8,929,623 B2
(45) Date of Patent: Jan. 6, 2015

(54) METHOD AND COMPUTER FOR AIDING DETERMINATION OF OBSTRUCTIVE SLEEP APNEA

(75) Inventors: Hung Ta Hsiao, Hsinchu (TW); Sheng Chuan Wang, Hsinchu (TW); Franco Lin, Hsinchu (TW); Lung Cheng Lee, Hsinchu (TW); Chih Min Yao, Hsinchu (TW); Ning Hung Chen, Hsinchu (TW); Chung Chih Yu, Hsinchu (TW)

(73) Assignee: National Applied Research Laboratories, Hsinchu (TW)

(*) Notice: Subject to any disclaimer, the term of this patent is extended or adjusted under 35 U.S.C. 154(b) by 319 days.

(21) Appl. No.: 12/913,580

(22) Filed: Oct. 27, 2010

(65) Prior Publication Data
US 2011/0293156 A1    Dec. 1, 2011

(30) Foreign Application Priority Data

May 26, 2010 (TW) .............................. 99116911 A

(51) Int. Cl.
 G06K 9/00 (2006.01)
 A61B 5/08 (2006.01)
 G06T 7/60 (2006.01)
 G06T 7/00 (2006.01)
 G06T 19/00 (2011.01)

(52) U.S. Cl.
 CPC .............. *G06T 7/602* (2013.01); *G06T 7/0012* (2013.01); *G06T 19/00* (2013.01); *G06T 2207/10081* (2013.01); *G06T 2207/30004* (2013.01); *G06T 2210/41* (2013.01); *G06T 2219/008* (2013.01); *G06T 2219/012* (2013.01)
 USPC .......................................... 382/128; 600/533

(58) Field of Classification Search
 CPC ................... G06T 17/02; G06T 17/20; G06T 2207/30004; G06T 7/0012; G06T 7/602; G06T 19/00; G06T 2207/10081; G06T 2210/41; G06T 2219/012; G06T 2219/008; G06F 19/3437; G06F 19/3437
 See application file for complete search history.

(56) References Cited

U.S. PATENT DOCUMENTS 6,556,696 B1 * 4/2003 Summers et al. ............. 382/128
2007/0255161 A1 * 11/2007 De Backer ................... 600/532

OTHER PUBLICATIONS

Palagyi et al., "A Sequential 3D Thinning Algorithm and Its Medical Applications", Jun. 22, 2001, Proceedings of 17th International Conference on Informational Processing in Medical Imaging, vol. 2082/2001, p. 409-415.*

(Continued)

*Primary Examiner* — Stephen R Koziol
*Assistant Examiner* — Timothy Choi
(74) *Attorney, Agent, or Firm* — Morris Manning & Martin LLP; Tim Tingkang Xia, Esq.

(57) ABSTRACT

A computer for aiding determination of Obstructive Sleep Apnea (OSA) includes a storage device storing with a medical image and a central processing unit (CPU). The CPU executes a method for aiding determination of OSA. The method for aiding determination of OSA includes the following steps. The medical image is obtained. An upper airway model is established. A narrowest cross-section and a nasopharyngeal boundary cross-section are defined in the airway model. A cross-sectional area of the narrowest cross-section and a cross-sectional area of the nasopharyngeal boundary cross-section are calculated. A stenosis rate is calculated according to the cross-sectional area of the narrowest cross-section and the cross-sectional area of the nasopharyngeal boundary cross-section. The stenosis rate is provided. In addition, in the method for aiding determination of OSA, a respiratory flow field simulation may be further performed to obtain and provide a flow field pressure distribution of the upper airway model.

22 Claims, 8 Drawing Sheets

(56) References Cited

OTHER PUBLICATIONS

Ota et al., "Quantitative Vascular Measurements in Arterial Occlusive Disease", Sep. 25, 2005, RadioGraphics, vol. 25, p. 1141-1158.*

Sung et al., "Customized Three-dimensional Computational Fluid Dynamics Simulation of the Upper Airway of Obstructive Sleep Apnea", Sep. 2006, The Angle Orthodontist, vol. 76, No. 5, p. 791-799.*

* cited by examiner

METHOD AND COMPUTER FOR AIDING DETERMINATION OF OBSTRUCTIVE SLEEP APNEA

CROSS-REFERENCE TO RELATED APPLICATIONS

This non-provisional application claims priority under 35 U.S.C. §119(a) on Patent Application No(s). 099116911 filed in Taiwan, R.O.C. on May 26, 2010, the entire contents of which are hereby incorporated by reference.

BACKGROUND OF THE INVENTION

1. Field of Invention

The present invention relates to a method and a computer for aiding determination of obstructive sleep apnea (OSA), and more particularly to a method and a computer for fast aiding determination of OSA.

2. Related Art

Obstructive Sleep Apnea (OSA) is a kind of disease that can cause sleep disorders, and is common in the middle-aged. When sleeping, the upper airway of a sufferer (comprising the nasopharynx, oropharynx, and laryngeal) recurrently collapses and obstructs, thus resulting in apnea, sleep fragmentation, and decreasing in a degree of blood oxygen saturation. In addition to the sleep interruption, the patient also may have accidents of angina pectoris, myocardial infarction, or brainstem stroke, or even sudden death during the sleep.

In the traditional diagnostic method, the patient needs to go to the sleeping center of a particular hospital to receive a polysomnography (PSG) physiological test to view the sleep quality. However, since the related medical resources are limited (especially in rural hospitals in remote areas), patients have to wait in line for a long time, and the scheduling waiting period of the patients may be three to six months. During the test procedure, the patients need to sleep overnight in the designated sleeping center to obtain sleep data of eight hours. In addition, follow-up analysis of the PSG data further takes time for the diagnosis. Therefore, the traditional diagnostic method is very inefficient, and is limited by specific surroundings.

In addition, because the patient has to be monitored by an electronic instrument in specific surroundings, the accuracy of the PSG data may be reduced because of various physiologic factors of the patient (such as anxiety, tension, or excitement). In addition, the PSG test only can provide an Apnea Hypopnea Index (AHI) of the patient. However, it is not accurate enough to determine whether the patient suffers from the OSA just based on the AHI. The AHI is a combination of apneas and hypopneas per hour during the sleep. Generally, the situation that the airflow through the mouth and nose stops for more than ten seconds is defined as the apnea, and the situation that gas exchange is reduced by 50% or more for more than ten seconds is defined as the hypopnea. Therefore, the PSG test has defects of high variability and low reliability.

SUMMARY OF THE INVENTION

In order to resolve the problems in the traditional OSA diagnostic method that the medical costs are high, and the test schedule is long and tedious, lacks efficiency, limited to the specific surroundings, and has low reliability, the present invention is related to a method and computer for aiding determination of an OAS, so as to assist a physician to determine whether the patient suffers from the OSA.

A computer for aiding determination of Obstructive Sleep Apnea (OSA) comprises a storage device and a central processing unit (CPU). The storage device stores with a medical image. The CPU executes a method for aiding determination of OSA.

The method for aiding determination of OSA comprises the following steps. The medical image is obtained. An upper airway model is established according to the medical image. A narrowest cross-section and a nasopharyngeal boundary cross-section are defined in the airway model. A cross-sectional area of the narrowest cross-section and a cross-sectional area of the nasopharyngeal boundary cross-section are calculated. A stenosis rate is calculated according to the cross-sectional area of the narrowest cross-section and the cross-sectional area of the nasopharyngeal boundary cross-section. The stenosis rate is provided for aiding determination.

In addition, the method for aiding determination of OSA may further comprise determining whether the stenosis rate is larger than a stenosis threshold.

The step of establishing the upper airway model according to the medical image comprises the following steps. The medical image is processed in a thresholding segmentation means to obtain an upper airway image segmentation region. The upper airway model corresponding to the upper airway image segmentation region is established with a Marching Cubes algorithm.

The medical image may be obtained according to a computed tomography scan (CT scan) of a part of the upper airway, and the medical image may be a file of Digital Imaging and Communications in Medicine (DICOM). The upper airway model established according to the medical image may be a three-dimensional (3D) model.

In addition, according to an embodiment of the present invention, the stenosis rate may be $$1.0 - \left( \frac{\text{cross-sectional area of the narrowest cross-section}}{\text{cross-sectional area of the nasopharyngeal boundary cross-section}} \right).$$

In order to assist the physician to accurately determine the status of the patient, the method for aiding determination of OSA may further comprises the following steps. An internal mesh data of the upper airway model is generated. A boundary condition is set. A respiratory flow field simulation is performed according to the upper airway model, the internal mesh data, and the boundary condition, so as to obtain a flow field pressure distribution of the upper airway model. The flow field pressure distribution of the upper airway model is provided for aiding determination.

The boundary condition may comprise an inlet region, an outlet region, and a respiratory gas amount. In addition, the method for aiding determination of OSA further comprises the following steps. An upper airway pressure difference is calculated according to the flow field pressure distribution. Whether the upper airway pressure difference is larger than a pressure difference threshold is determined.

Based on the above, in the method and computer for aiding determination of OSA, the upper airway model of the patient is established according to the medical image of the CT scan, so as to obtain the stenosis rate. The CT scan occupies little time, and the equipment has been popular in major hospitals for a long time, and thus, it is very convenient for the patient to see a physician. In addition, the fluid pressure distribution inside the airway may be obtained according to the fluid simulation, so as to assist the physician to determine the illness more accurately. What's more, the time the stenosis rate calculation or the flow field simulation takes is much less than that the traditional method for testing and determining takes, thus having an advantage of customization for different patients.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

The detailed features and advantages of the present invention are described below in great detail through the following embodiments, the content of the detailed description is sufficient for those skilled in the art to understand the technical content of the present invention and to implement the present invention there accordingly. Based upon the content of the specification, the claims, and the drawings, those skilled in the art can easily understand the relevant objectives and advantages of the present invention.

Figure 1:
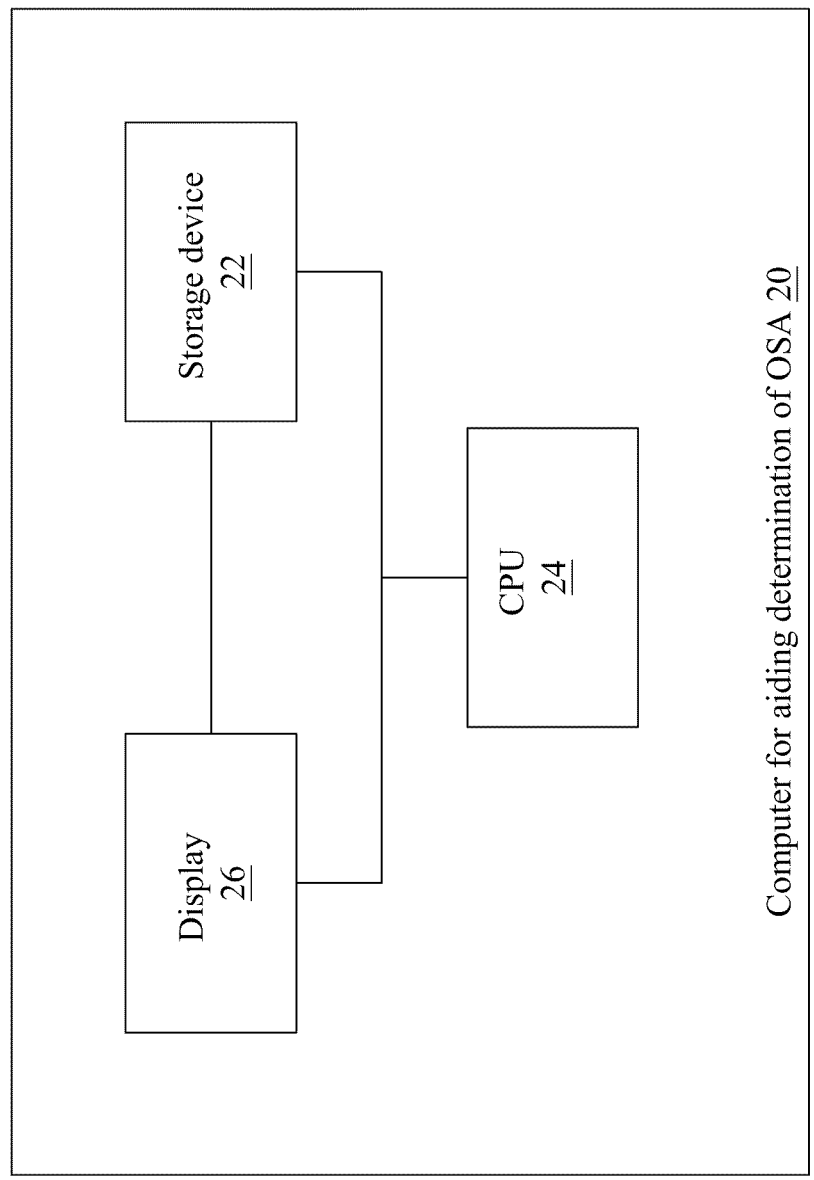
FIG. 1 is a block diagram of a computer for aiding determination of OSA according to an embodiment of the present invention.
Figure 2:
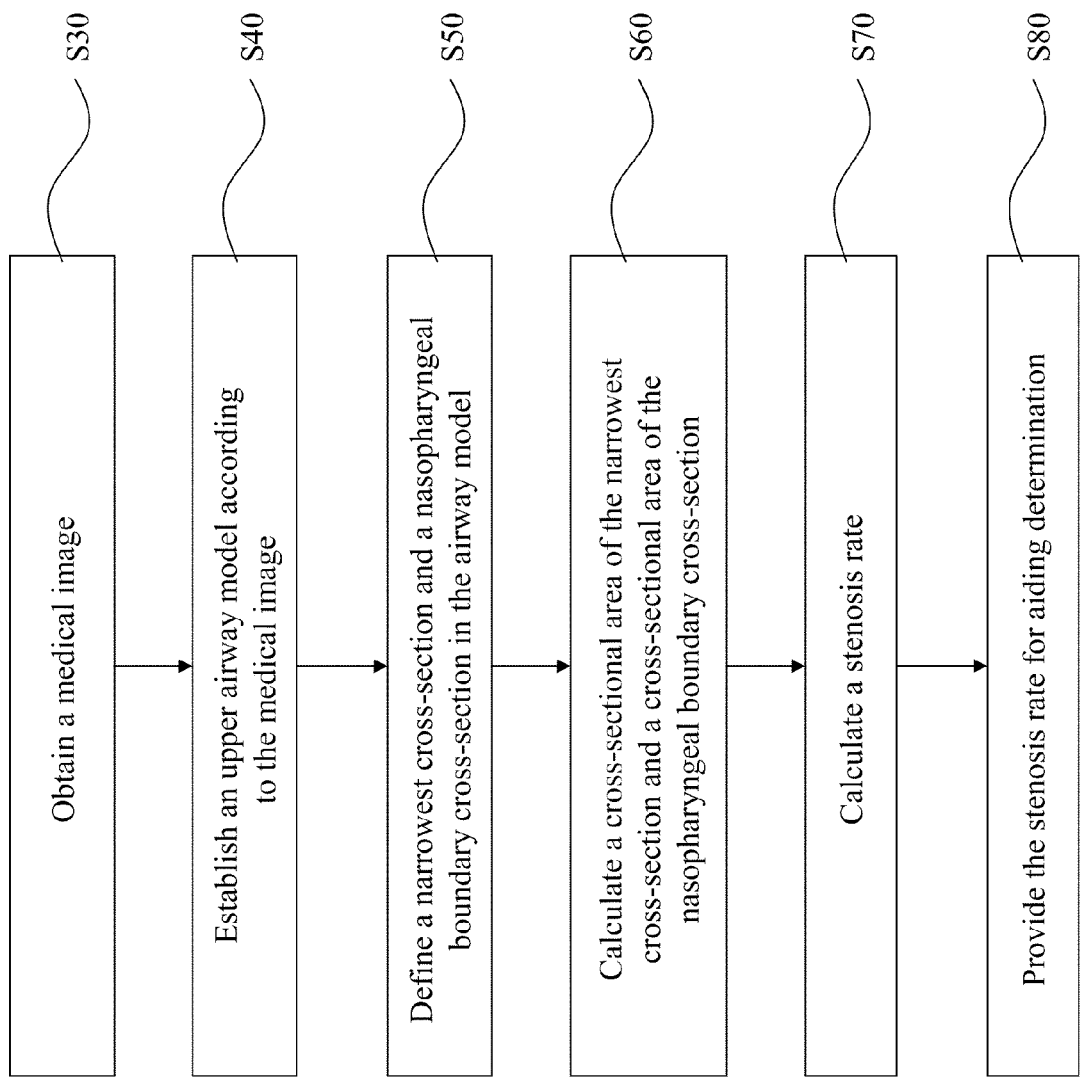
FIG. 2 is a flow chart of a method for aiding determination of OSA according to an embodiment of the present invention.

The present invention provides a method and a computer for aiding determination of Obstructive Sleep Apnea (OSA), which may generate a stenosis rate and a flow field pressure distribution of an upper airway of a patient, so as to assist a physician to fast determine whether the patient suffers from the OSA. Referring to FIG. 1 and FIG. 2, FIG. 1 is a block diagram of a computer for aiding determination of OSA according to an embodiment of the present invention, and FIG. 2 is a flow chart of a method for aiding determination of OSA according to an embodiment of the present invention. The computer 20 for aiding determination of OSA (briefed as computer 20) comprises a storage device 22, a central processing unit (CPU) 24, and a display 26, and the computer 20 may be computer equipment such as a desktop computer, a server, or a high-speed computing host.

The CPU 24 firstly needs to obtain a medical image of the patient (step S30), and the medical image may be a file in a format of Digital Imaging and Communications in Medicine (DICOM). The DICOM is a common standard protocol, and is used for processing, storing, printing, and transmitting medical images. The DICOM comprises a definition of file format and a network communication protocol, and in the network, it is an application protocol based on the Transmission Control Protocol/Internet Protocol (TCP/IP), and contacts with different systems with TCP/IP. Between two medical instruments that can support the DICOM format, images and patient data may be received and exchanged according to the file in the DICOM format. Therefore, the medical image in the DICOM format may be integrated and applied to medical image instruments, servers, workstation, printers, and network equipments of different manufacturers.

The medical image obtained in step S30 may be obtained according to a CT scan of a part of the upper airway of the patient. In other words, after a sufferer performs the CT scan of the part of the upper airway, the medical image required by the computer-aided method (the CPU 24) may be obtained. The medical image may be stored in the storage device 22, and act as input data of the computer-aided method. It should be noted that the examining process of the CT scan is generally about 15 to 20 minutes, which is much less than the time that a PSG physiological test takes.

Figure 3:
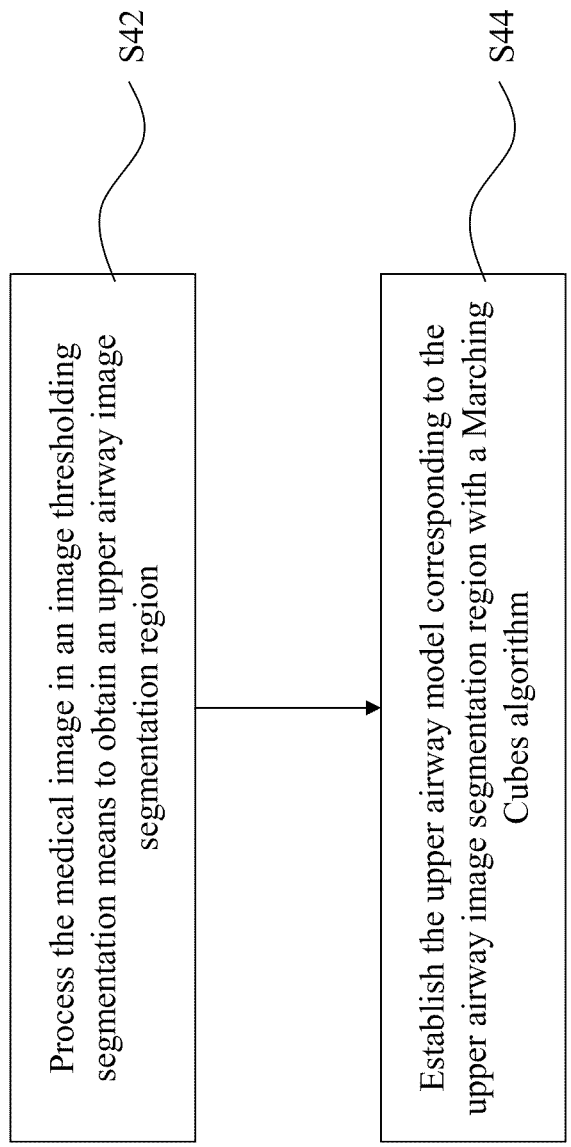
FIG. 3 is a flow chart of step S40 according to an embodiment of the present invention.

After the medical image is obtained, an upper airway model is then established according to the medical image (step S40). Referring to FIG. 3 at the same time, FIG. 3 is a flow chart of step S40 according to an embodiment of the present invention. In order to establish the upper airway model, the medical image is firstly processed in a thresholding segmentation means to obtain an upper airway image segmentation region (step S42). The parts other than the upper airway image are taken away from the original medical image, so that the simple upper airway image segmentation region is obtained. After the upper airway image segmentation region is processed with a Marching Cubes algorithm, the upper airway model corresponding to the upper airway image segmentation region is established (step S44). The upper airway model established according to the medical image may be a three dimensional (3D) model.

Figure 4B:
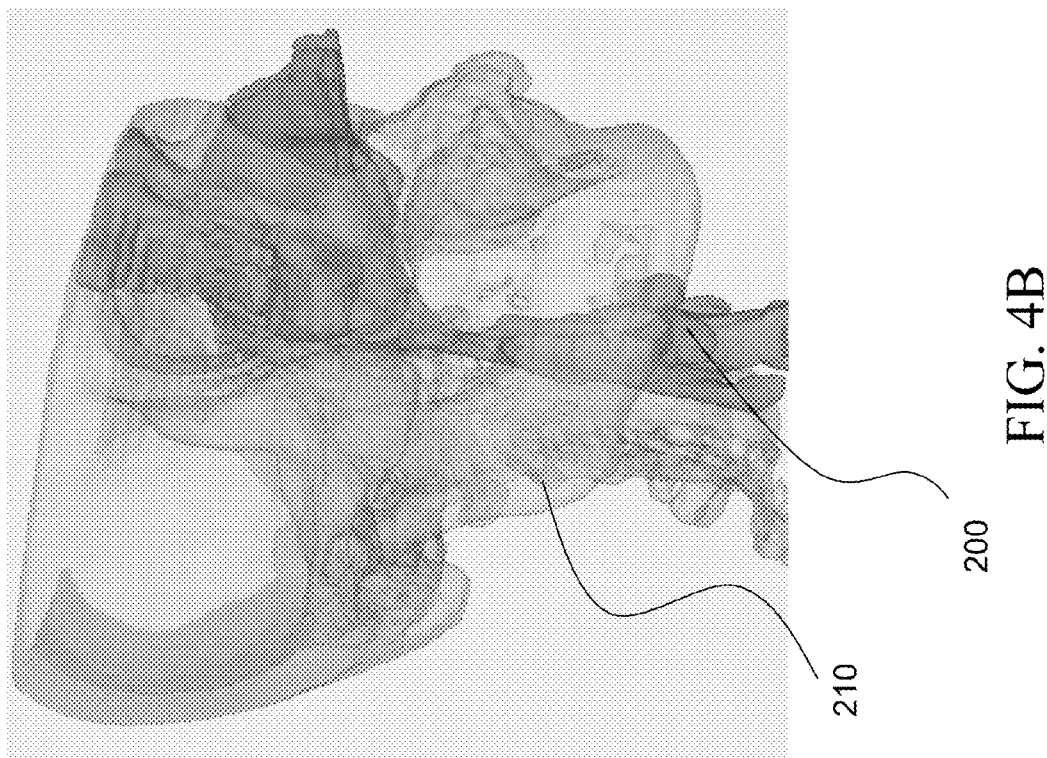
FIG. 4B is a schematic view of an upper airway and skull model according to an embodiment of the present invention.
Figure 4A:
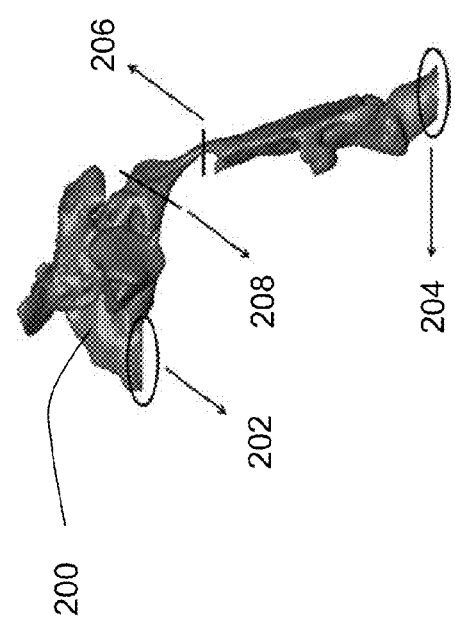
FIG. 4A is a schematic view of an upper airway model according to an embodiment of the present invention.

Referring to FIG. 4A and FIG. 4B, FIG. 4A is a schematic view of an upper airway model according to an embodiment of the present invention, and FIG. 4B is a schematic view of an upper airway and skull model according to an embodiment of the present invention.

An upper airway model 200 comprises a nasopharynx, oropharynx, and laryngeal of the patient, and positions of these parts in a human body may be more easily understood by combining a skull model 210. The CPU 24 defines a narrowest cross-section 206 having a smallest cross-sectional area in a direction of the skull axis in the upper airway model 200, and a nasopharyngeal boundary cross-section 208 in the direction of the skull axis (step S50). The narrowest cross-section 206 may be obtained through an automatic calculation by the computer 20 according to the medical image or the established upper airway model 200. The nasopharyngeal boundary cross-section 208 also may be automatically determined through a trained computer-aided method according to a rule of thumb. Preferably, the nasopharyngeal boundary cross-section 208 is manually specified after a medical staff compares data such as the medical image.

The CPU 24 calculates a cross-sectional area of the narrowest cross-section 206 and a cross-sectional area of the nasopharyngeal boundary cross-section 208 (step S60), and calculates the stenosis rate according to the cross-sectional area of the narrowest cross-section 206 and the cross-sectional area of the nasopharyngeal boundary cross-section 208 (step S70).

The calculation approach of the stenosis rate may be $$1.0 - \left( \frac{\text{cross-sectional area of the narrowest cross-section}}{\text{cross-sectional area of the nasopharyngeal boundary cross-section}} \right).$$

The stenosis rate indicates a stenosis degree of the upper airway of the patient. The greater stenosis rate indicates more severe stenosis degree of the upper airway of the patient, and greater strength the patient needs to breathe. For example, in different patients with the nasopharyngeal boundary cross-section 208 having the same cross-sectional area, the patient with a smaller cross-sectional area of the narrowest cross-section 206 has a higher probability to suffer from the OSA. According to the clinical data, when the stenosis rate is greater than 85%, the patient has a very high probability to suffer from the OSA. When the stenosis rate is greater than 90%, the patient may be a critically ill patient, and require a treatment of surgery.

Therefore, the stenosis rate may act as a proof for determining the OSA of the patient. The computer 20 may provide the stenosis rate by displaying the data on the display 26 or by printing for aiding determination (step S80). In addition, the computer 20 also may provide the physician with a relation curve between the stenosis rate and an Apnea Hypopnea Index (AHI) (briefed as a stenosis rate-AHI relation curve). The stenosis rate-AHI relation curve is obtained according to the clinical data, and thus the physician can compare the stenosis rate of the patient and the stenosis rate-AHI relation curve, and determine the illness of the patient according to experience.

In addition, in the computer-aided method for determining the OSA, whether the stenosis rate is larger than a stenosis threshold may be determined. The stenosis threshold may be specified by the physician according to experience, or may be an average of the stenosis rates of OSA patients calculated by the system. Similarly, in the computer-aided method (i.e. method for aiding determination), multiple stenosis thresholds may be recorded simultaneously, and respectively correspond to the averages of the stenosis rates of low-grade OSA sufferers, middling OSA sufferers, and severe OSA sufferers.

Compared with the polysomnography (PSG) test that requires sleep data of eight hours, the medical image required in the computer-aided method for determining the OSA can be obtained in 20 minutes. In the computer-aided method, the speed of establishing the upper airway model 200 according to the medical image and the speed of calculating the stenosis rate are very fast, and generally, the stenosis rate of the patient may be obtained in five minutes. The CT scan has been popular in major hospitals, and the medical costs it spends are also very low.

However, in a particular exceptional situation, such as in the narrow and long upper airway, the reliability of determining the illness according to the stenosis rate may be slightly decreased. The stenosis rate of a patient with a narrow and long upper airway will not be too high. However, since the stenosis range of the upper airway is quite narrow and long, patients with a narrow and long upper airway is also a high risk group of OSA. Accordingly, in addition to the stenosis rate for the physician to fast determination, the computer-aided method for determining the OSA may further provide the flow field pressure distribution of the upper airway of the patient, so that the physician can perform accurate determination.

Figure 5:
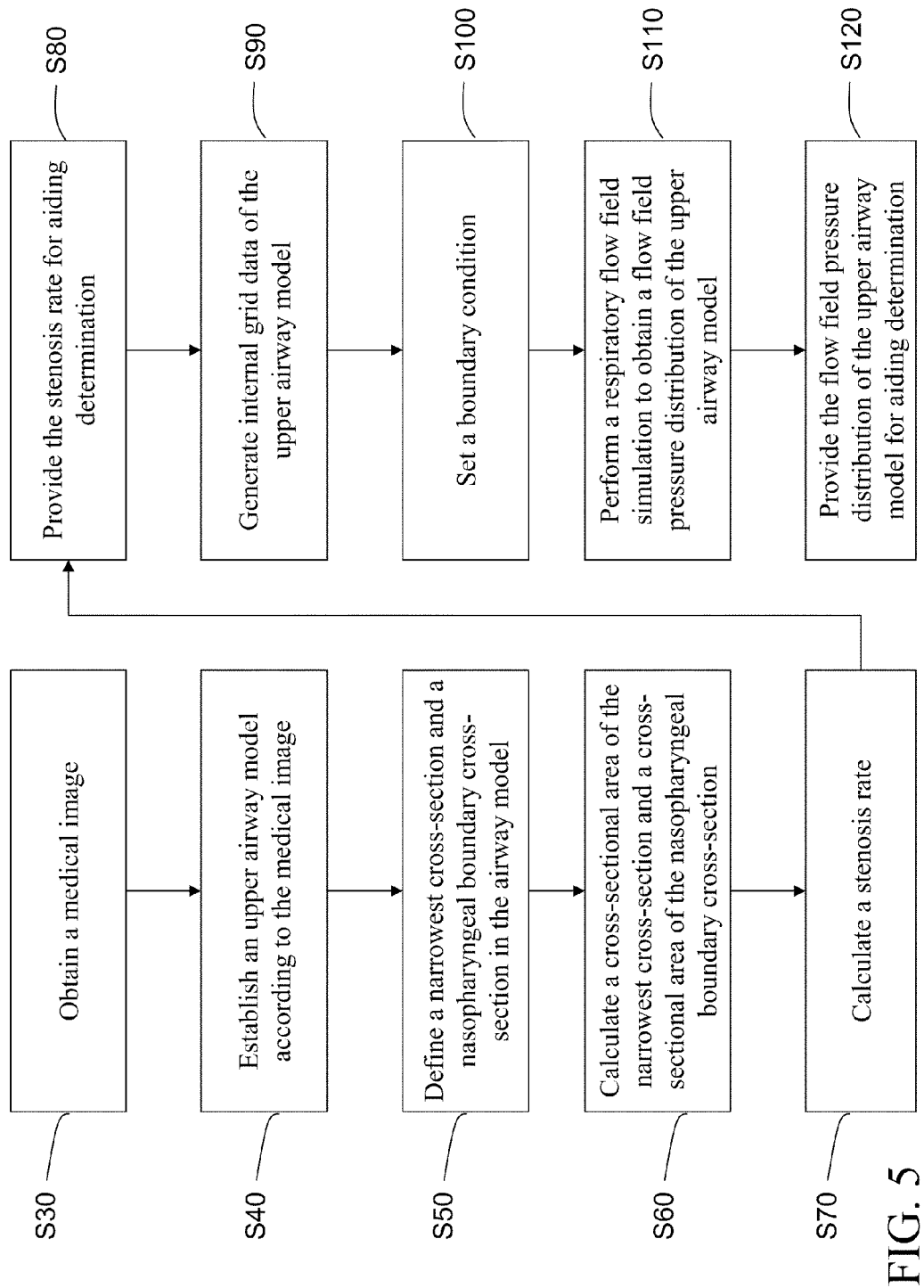
FIG. 5 is a flow chart of a method for aiding determination of OSA according to another embodiment of the present invention.

Referring to FIG. 5, FIG. 5 is a flow chart of a method for aiding determination of OSA according to another embodiment of the present invention. After calculating the stenosis rate and providing it to the physician, the computer 20 may further generate the flow field pressure distribution of the patient in the following steps.

Figure 6:
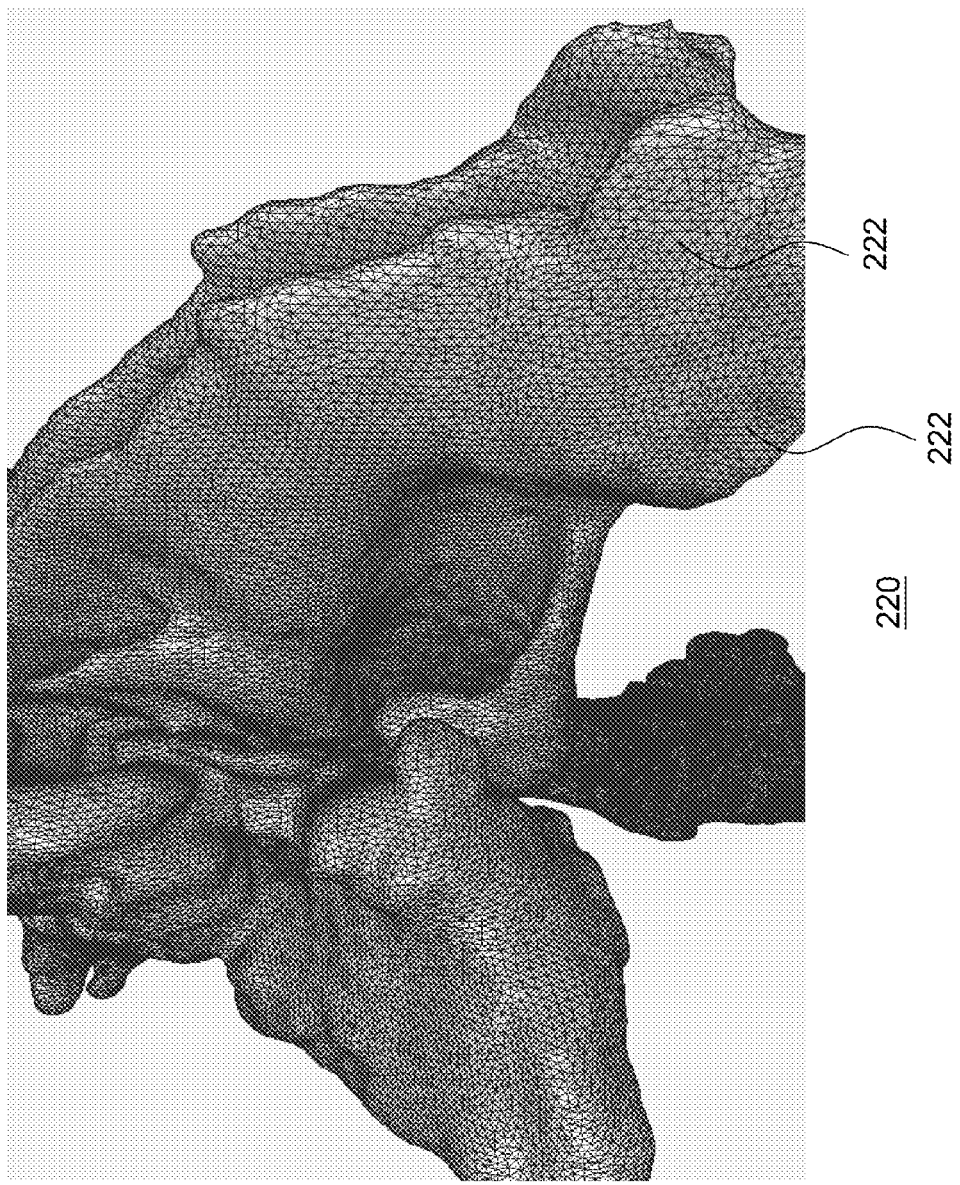
FIG. 6 is a schematic view of a mesh according to an embodiment of the present invention.

The computer 20 firstly generates an internal mesh data of the upper airway model 200 (step S90), in which the internal mesh data may be obtained after a mesh generation software ICEM-CFD processes the upper airway model 200. Referring to FIG. 6 at the same time, FIG. 6 is a schematic view of a mesh according to an embodiment of the present invention. The upper airway model 200 is the 3D model, and it can be imagined that the upper airway is a hollow space. In order to simulate a gas flow status in the upper airway (that is, the flow field simulation), data of the hollow space needs to be constructed. In step S90, the computer 20 fills the internal mesh data 220 in the space of the upper airway model 200. The internal mesh data 220 comprises a plurality of meshes 222, and these meshes 222 fill the hollow space in the upper airway model 200.

Then, a boundary condition of the flow field simulation needs to be set for the upper airway model 200 and the internal mesh data 220 (step S100). Referring to FIG. 4A, the boundary condition may comprise an inlet region 202, an outlet region 204, and a respiratory gas amount. The inlet region 202 and the outlet region 204 are the two sides where air enters and leaves the upper airway when the human is breathing. The inlet region 202 may be set as a part of nostrils in the upper airway model 200, and the outlet region 204 may be set as a part of trachea. The respiratory gas amount may be set according to the flow of a normal breath of a common person, for example, the respiratory gas amount of an adult may be set as 500 ml. In addition, the air pressure value outside the outlet region 204 may be set as 1 atmosphere or other subtle simulation parameters.

A respiratory flow field simulation may be performed according to the upper airway model 200, the internal mesh data 220, and the boundary condition, so as to obtain the flow field pressure distribution of the upper airway model 200 (step S110). The computer 20 provides the flow field pressure distribution of the upper airway model 200 to the physician for aiding determination (step S120). The computer 20 may use a fluid dynamics numerical simulation and analysis software FLUENT to perform the flow field simulation. Each mesh 222 is a point for data exchanging when the flow field simulation is performed. The software FLUENT calculates the air flow passing in and out each mesh 222, so as to obtain the air pressure at the position corresponding to the mesh 222. Thereby, the computer 20 obtains the flow field pressure distribution of the upper airway model 200, that is, the simulation result of the flow field simulation. The flow field pressure distribution also can be regarded as a respiratory pressure difference, which indicates the air pressure difference in all regions of the upper airway when the patient is inhaling.

Figure 7B:
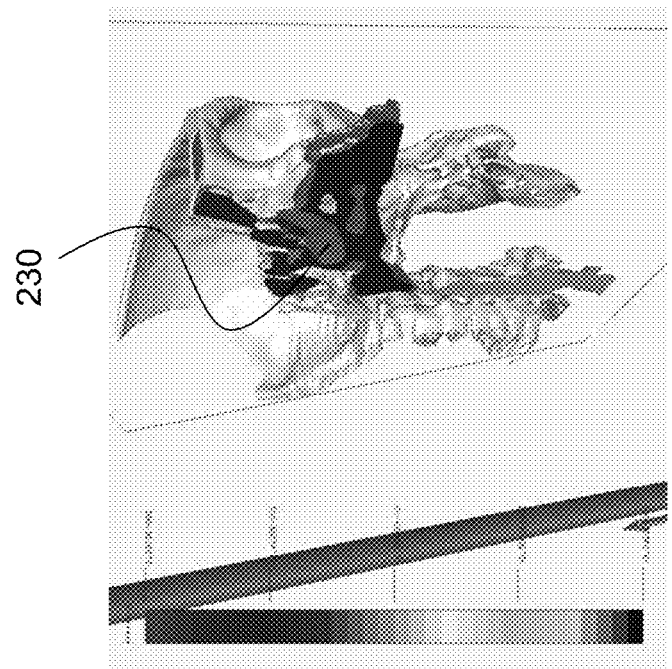
FIG. 7B is a cross-sectional schematic view of a flow field pressure distribution according to an embodiment of the present invention.
Figure 7A:
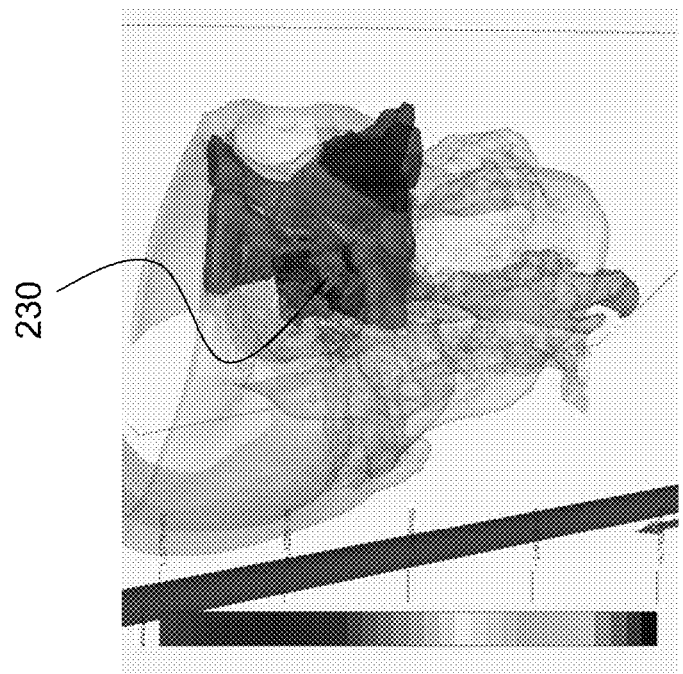
FIG. 7A is a schematic view of a flow field pressure distribution according to an embodiment of the present invention.

Referring to FIG. 7A and FIG. 7B, FIG. 7A is a schematic view of a flow field pressure distribution according to an embodiment of the present invention, and FIG. 7B is a cross-sectional schematic view of a flow field pressure distribution according to an embodiment of the present invention. FIG. 7A and FIG. 7B are visualized figures of the result of the respiratory flow field simulation, and thereby, the physician can easily understand the status of the flow field pressure distribution 230 in an intuitive way. In the flow field pressure distribution 230, different colors may be used to indicate different air pressure values, and the physician may further understand the pressure distribution inside the cross-section by viewing the cross-sectional schematic view.

In addition, in the computer-aided method for determining the OSA, based on the flow field pressure distribution 230, an upper airway pressure difference (that is, a pressure difference from the nostrils to the trachea) may be calculated, and whether the upper airway pressure difference is larger than a pressure difference threshold is determined. The upper airway pressure difference may be obtained according to respiratory flow resistance information generated by the flow field simulation. A respiratory module is used to output a mean pressure on the surfaces of the inlet region 202 and the outlet region 204, and assist the computer 20 to calculate and obtain the upper airway pressure difference.

The computer 20 may further provide the physician with a relation curve between the upper airway pressure difference and the stenosis rate for the physician's reference. The relation curve between the upper airway pressure difference and the stenosis rate is obtained according to clinical data, and thus the physician can compare the relation curve between the upper airway pressure difference and flow field pressure distribution and the stenosis rate, and determine the illness of the patient according to experiences. In addition, the computer 20 may determine whether the upper airway pressure difference is larger than the preset pressure difference threshold, so as to assist to determine the illness of the patient.

Figure 8:
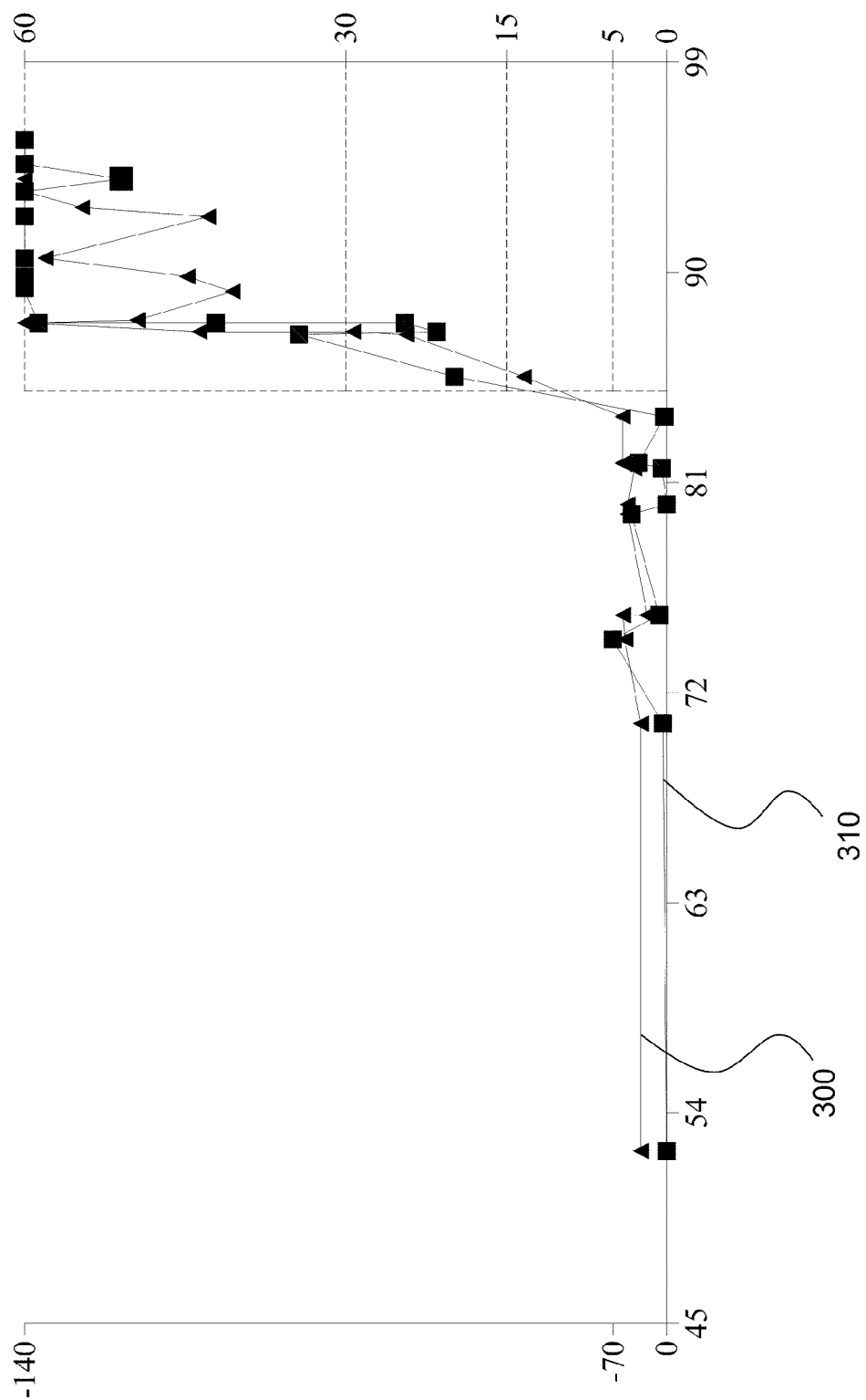
FIG. 8 is a relation curve diagram among a stenosis rate, an upper airway pressure difference, and an AHI according to an embodiment of the present invention.

Referring to FIG. 8, FIG. 8 is a relation curve diagram among a stenosis rate, an upper airway pressure difference, and an AHI according to an embodiment of the present invention. It can be known from the stenosis rate-AHI relation curve 300 and the relation curve between the stenosis rate and the upper airway pressure difference 310 that, when the stenosis rate is higher than 85%, a corresponding AHI or upper airway pressure difference is very large. In addition, in the relation curve diagram, different regions indicating severity of the illness are segmented according to conventional AHI index for the physician's reference.

By obtaining the flow field pressure distribution according to the completed respiratory flow field simulation of the upper airway, and further by comparing with the relation curve between the upper airway pressure difference and the stenosis rate in the storage device 22, the physician can perform more accurate determination. If a high-speed computing host (such as IBM Cluster 1350) is used, the respiratory flow field simulation only takes two to three hours, which is still much less than the time that the PSG test takes.

Based on the above, in the method and computer for aiding determination of OSA, the upper airway model of the patient is established according to the medical image of the CT scan, and the stenosis rate of the upper airway is calculated. It is not only very fast for the calculation and obtaining of the stenosis rate, but the stenosis rate is directed to each patient, and further has an advantage of customization. All the general large hospitals have the equipments of CT scan, and the patients do not need to be limited by the few hospitals equipped with the PSG equipments, and neither need to perform a PSG test for a long time under an unfamiliar situation.

In addition, in the method and computer for aiding determination of OSA, the fluid simulation during the breath may be performed according to the upper airway model of the patient, and then the fluid pressure distribution inside the airway may be obtained. Thus, the physician is assisted to determine the illness more accurately, much trouble is avoided, and much time is saved. That is to say, the method and computer for aiding determination of OSA successfully address the problems in the traditional OSA diagnostic method that the medical costs are high, and the test schedule is long and tedious, lacks efficiency, limited to the specific surroundings, and has low reliability.

What is claimed is:

1. A method for aiding determination of Obstructive Sleep Apnea (OSA), comprising:
   obtaining a medical image;
   establishing an upper airway model according to the medical image;
   defining a narrowest cross-section having a smallest cross-sectional area orthogonal to a skull axis in the upper airway model and defining a nasopharyngeal boundary cross-section orthogonal to the skull axis in the upper airway model;
   calculating a cross-sectional area of the narrowest cross-section and a cross-sectional area of the nasopharyngeal boundary cross-section;
   calculating a stenosis rate according to the cross-sectional area of the narrowest cross-section and the cross-sectional area of the nasopharyngeal boundary cross-section;
   generating an internal mesh data of the upper airway model;
   setting a boundary condition comprising an inlet region, an outlet region, and a respiratory gas amount;
   performing a respiratory flow field simulation according to the upper airway model, the internal mesh data, and the boundary condition, so as to obtain a flow field pressure distribution of the upper airway model;
   calculating an upper airway pressure difference according to the flow field pressure distribution; and
   establishing a first relation curve between the stenosis rate and the upper airway pressure difference, for aiding determination.

2. The method for aiding determination of OSA according to claim 1, wherein the medical image is obtained according to a computed tomography scan (CT scan) of a part of the upper airway.

3. The method for aiding determination of OSA according to claim 1, wherein the medical image is a file of Digital Imaging and Communications in Medicine (DICOM).

4. The method for aiding determination of OSA according to claim 1, wherein the upper airway model is a three dimensional (3D) model.

5. The method for aiding determination of OSA according to claim 4, wherein the step of establishing the upper airway model according to the medical image comprises:
   processing the medical image in a thresholding segmentation means to obtain an upper airway image segmentation region; and
   establishing the upper airway model corresponding to the upper airway image segmentation region with a Marching Cubes algorithm.

6. The method for aiding determination of OSA according to claim 1, wherein the stenosis rate is $$1.0 - \left( \frac{\text{the cross-sectional area of the narrowest cross-section}}{\text{the cross-sectional area of the nasopharyngeal boundary cross-section}} \right).$$

7. The method for aiding determination of OSA according to claim 1, further comprising:
   determining whether the stenosis rate is larger than a stenosis threshold.

8. The method for aiding determination of OSA according to claim 1, further comprising:
   determining whether the upper airway pressure difference is larger than a pressure difference threshold.

9. The method for aiding determination of OSA according to claim 1, wherein the upper airway pressure difference is obtained according to respiratory flow resistance information generated by the flow field simulation.

10. The method for aiding determination of OSA according to claim 1, wherein the upper airway pressure difference is obtained according to a mean pressure on surfaces of the inlet region and the outlet region.

11. The method for aiding determination of OSA according to claim 1, further comprising:
    establishing a second relation curve between the stenosis rate and apnea hypopnea indexes, for aiding determination.

12. A computer for aiding determination of Obstructive Sleep Apnea (OSA), comprising:
    a storage device, for storing a medical image; and
    a central processing unit (CPU), for executing the following steps:
      obtaining the medical image;
      establishing an upper airway model according to the medical image;
      defining a narrowest cross-section having a smallest cross-sectional area orthogonal to a skull axis in the upper airway model and defining a nasopharyngeal boundary cross-section orthogonal to the skull axis in the upper airway model in the direction of the skull axis;
      calculating a cross-sectional area of the narrowest cross-section and a cross-sectional area of the nasopharyngeal boundary cross-section;
      calculating a stenosis rate according to the cross-sectional area of the narrowest cross-section and the cross-sectional area of the nasopharyngeal boundary cross-section;
      generating an internal mesh data of the upper airway model;
      setting a boundary condition comprising an inlet region, an outlet region, and a respiratory gas amount ;
      performing a respiratory flow field simulation according to the upper airway model, the internal mesh data, and the boundary condition, so as to obtain a flow field pressure distribution of the upper airway model;
      calculating an upper airway pressure difference according to the flow field pressure distribution; and
      establishing a first relation curve between the stenosis rate and the upper airway pressure difference, for aiding determination.

13. The computer for aiding determination of OSA according to claim 12, wherein the medical image is obtained according to a computed tomography scan (CT scan) of a part of the upper airway.

14. The computer for aiding determination of OSA according to claim 12, wherein the medical image is a file of Digital Imaging and Communications in Medicine (DICOM).

15. The computer for aiding determination of OSA according to claim 12, wherein the upper airway model is a three dimensional (3D) model.

16. The computer for aiding determination of OSA according to claim 15, wherein the step of establishing the upper airway model according to the medical image comprises:
    processing the medical image in a thresholding segmentation means to obtain an upper airway image segmentation region; and
    establishing the upper airway model corresponding to the upper airway image segmentation region with a Marching Cubes algorithm.

17. The computer for aiding determination of OSA according to claim 12, wherein the stenosis rate is $$1.0 - \left( \frac{\text{the cross-sectional area of the narrowest cross-section}}{\text{the cross-sectional area of the nasopharyngeal boundary cross-section}} \right).$$

18. The computer for aiding determination of OSA according to claim 12, wherein the CPU further executes the following step:
    determining whether the stenosis rate is larger than a stenosis threshold.

19. The computer for aiding determination of OSA according to claim 12, wherein the CPU further executes a following step:
    determining whether the upper airway pressure difference is larger than a pressure difference threshold.

20. The computer for aiding determination of OSA according to claim 12, wherein the upper airway pressure difference is obtained according to respiratory flow resistance information generated by the flow field simulation.

21. The computer for aiding determination of OSA according to claim 12, wherein the upper airway pressure difference is obtained according to a mean pressure on surfaces of the inlet region and the outlet region.

22. The computer for aiding determination of OSA according to claim 12, comprising:
    establishing a second relation curve between the stenosis rate and apnea hypopnea indexes, for aiding determination.

\* \* \* \* \*